United States Patent
Young et al.

(10) Patent No.: US 6,244,542 B1
(45) Date of Patent: Jun. 12, 2001

(54) ROTOR DRIVEN EDGE

(75) Inventors: Kendall Gardner Young, Coppell; Steven Louis Pauletti, Mesquite, both of TX (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/357,595

(22) Filed: Jul. 20, 1999

(51) Int. Cl.$^7$ .................................................. B64C 9/00
(52) U.S. Cl. .................................... 244/213; 244/225
(58) Field of Search ............................ 244/211–215, 219, 244/225, 90 R

(56) References Cited

U.S. PATENT DOCUMENTS

| | | |
|---|---|---|
| 1,759,032 | 5/1930 | Bauer . |
| 2,670,909 | 3/1954 | Replogle ................................ 244/42 |
| 3,109,613 | 11/1963 | Bryant et al. ......................... 244/44 |
| 3,944,170 * | 3/1976 | Musgrove .............................. 244/44 |
| 4,247,066 * | 1/1981 | Frost et al. ........................... 244/219 |
| 4,286,761 * | 9/1981 | Musgrove ......................... 244/75 R |
| 4,402,277 * | 9/1983 | Wainwright ......................... 114/103 |
| 4,441,675 * | 4/1984 | Boehringer et al. ................. 244/213 |
| 4,471,925 * | 9/1984 | Kunz ................................... 244/130 |
| 4,618,109 * | 10/1986 | Victor ................................. 244/130 |
| 4,892,274 | 1/1990 | Pohl et al. ........................... 244/213 |
| 5,004,189 | 4/1991 | Igram ................................. 244/219 |
| 5,098,043 * | 3/1992 | Arena ................................. 244/215 |
| 5,161,757 * | 11/1992 | Large ................................. 244/216 |
| 5,222,699 * | 6/1993 | Albach et al. ...................... 244/213 |
| 5,344,103 | 9/1994 | Fitzgibbon et al. .................. 244/75 |
| 6,145,791 * | 11/2000 | Diller et al. ........................ 244/215 |
| 6,152,405 * | 11/2000 | Muller ................................ 244/219 |

* cited by examiner

*Primary Examiner*—Peter M. Poon
*Assistant Examiner*—Kevin Jakel
(74) *Attorney, Agent, or Firm*—Terry J. Anderson; Karl J. Hoch, Jr.

(57) ABSTRACT

In accordance with the present invention, there is provided an aerodynamic control device for use with an aerodynamic lifting member. The lifting member is defined by a horizontal reference plane disposed therethrough. The control device is provided with at least one support rotor extending from the lifting member. The support rotor is sized and configured to rotate about a rotor axis of rotation which is disposed generally parallel to the horizontal reference plane. The support rotor has an inboard segment which is disposed along the rotor axis of rotation and in rotational communication with the lifting member. The support rotor has an outboard segment disposed off-set from the rotor axis of rotation. The control device is further provided with a control device body which is engaged with the outboard segment of the support rotor. The control device body is sized and configured to translate generally orthogonal to the horizontal reference plane in response to rotation of the support rotor.

32 Claims, 5 Drawing Sheets

ROTOR DRIVEN EDGE

FIELD OF THE INVENTION

The present invention relates generally to aircraft aerodynamic control surfaces, and more particularly to an aerodynamic control device configured to vertically translate.

BACKGROUND OF THE INVENTION

Conventional fixed winged aircraft are provided with a variety of aerodynamic control devices which include, for example, flaps, elevators, ailerons, trim tabs, and rudders. These control devices cooperatively operate to increase or decease lift over a given localized aerodynamic control surface for achieving pitch, yaw and roll control of the aircraft. Such control devices are used in both traditional winged and modern stealthy aircraft designs.

These control devices are typically rigid structures which are integrated into the edges of the wings or body (i.e., aerodynamic lifting surfaces) of the aircraft. The control devices are configured to deflect or rotate about an axis of rotation in a hinge-like fashion with respect to the attached aerodynamic lifting surfaces. Traditionally, these conventional control devices are actuated by the application of torque about an axis which is parallel to the trailing edge of the device. As such, the torque or power requirement of such devices is directly proportional to impinging air loads as the control device is rotated into an oncoming airflow. Thus, the greater the desired control device deflection, the greater the torque required to cause and maintain such deflection.

In addition, these conventional control devices are generally rigid structures which maintain their shape while being deflected or rotated about an axis which is generally parallel to the wing trailing edge. As such, gaps or abrupt contour changes occur at the lateral hinge line area of these conventional control devices. Further, as the control devices are rotated, chordwise gaps are formed between the edges of the hinged control devices and the adjacent fixed portions of the wing assembly.

It is contemplated that gaps, abrupt changes, or contour discontinuities occurring between the aerodynamic lifting surface and the attached control device are especially undesirable because they tend to increase aerodynamic drag and lessen the aerodynamic effectiveness of the control surface due to "leakage" at the end portions of the control device.

It is therefore evident that there exists a need in the art for an improved control device system which has a mitigated torque power requirement and mitigates the formation of gaps and abrupt surface contour changes occurring between an aerodynamic lifting surface and an attached control device.

SUMMARY OF THE INVENTION

In accordance with the present invention, there is provided an aerodynamic control device for use with an aerodynamic lifting member. The lifting member is defined by a horizontal reference plane disposed therethrough. The control device is provided with at least one support rotor extending from the lifting member. The support rotor is sized and configured to rotate about a rotor axis of rotation which is disposed generally parallel to the horizontal reference plane. The support rotor has an inboard segment which is disposed along the rotor axis of rotation and in rotational communication with the lifting member. The support rotor has an outboard segment disposed off-set from the rotor axis of rotation. The control device is further provided with a control device body which is engaged with the outboard segment of the support rotor. The control device body is sized and configured to translate generally orthogonal to the horizontal reference plane in response to rotation of the support rotor. Preferably, the control device body has a body trailing edge and axis of rotation of the support rotor is disposed generally perpendicular to the body trailing edge.

In the preferred embodiment of the present invention, rotational actuators are provided for rotating the support rotors. The actuators are disposable within the lifting member and in mechanical communication with the inboard segments of the support rotors. Further, the at least one support rotor comprises a pair of support rotors. The control device body has a slot formed therein. The outboard segments of the support rotors are sized and configured to slidably engage the slot. Opposing rotation of the support rotors causes the control device body to translate orthogonal to the horizontal reference plane. Further, the control device body is sized and configured to rotate about a roll axis which is generally parallel to the rotor axes of rotation in response to a differential amount of rotation of the support rotors.

Preferably, the aerodynamic lifting member has an indenture formed therein. The indenture is defined by first and second shoulder portions. The control device body has opposing first and second ends thereof. The control device further comprises first and second transition portions respectively attached to the first and second ends of the control device body. The first and second transition portions are attached to the first and second shoulder portions of the indenture. The first and second transition portions are sized and configured to deform in response to translation of the control device body.

In addition, the lifting member has upper and lower lifting member surfaces and the control device body has upper and lower body surfaces. The control device is further provided with upper and lower flexible outer skins. The upper flexible outer skin is attached to the upper lifting member surface and the upper body surface and the lower flexible outer skin is attached to the lower lifting member surface and the lower body surface. The outer skins are sized and configured to deform in response to translation of the control device body. In particular, the control device body has an upper deflected position with the control device body translated in a direction of the upper body surface. Similarly, the control device body has a lower deflected position with the control device body translated in a direction of the lower body surface. The upper and lower flexible outer skins are sized and configured to be disposed in tension while the control device body is in either the upper or lower deflected positions.

As such, based on the foregoing, the present invention mitigates the inefficiencies and limitations associated with prior art aerodynamic control devices. Significantly, actuation of the control device of the present invention is effectuated by the application of torque to the support rotor for translating the control device body generally orthogonal (i.e., vertically) to the horizontal reference plane of the lifting member. As further discussed below, such a configuration is particularly advantageous because the power or torque requirement of the control device is different than that of conventional prior art rotating control devices.

In general, as the deflection of a control device is increased, there is a corresponding increase in control surface area which is projected upon a fuselage station plane or that plane which is generally orthogonal to the direction of flight. As one of ordinary skill in the art can appreciate, as such projected control surface area is increased, there is a corresponding increase in the induced air load against the control device.

A conventional trailing edge control device, such as a flap, is configured to rotate about a spanwise or lateral axis with respect to the wing or trailing edge thereof. The torque or power requirement to actuate such a conventional control device is roughly proportional to the air load against the control device. In this respect, the torque or power requirement to actuate and maintain such a conventional control device in a slightly deflected position is minimal, because the projected surface area and therefore the air load thereon is minimal. Further, where the control device is in a maximum deflection position (i.e., flap fully up or flap fully down), the control device is at its maximum torque or power actuation requirement.

As mentioned above, actuation of the control device of the present invention is effectuated by the application of torque to the support rotors generally perpendicular to a spanwise or lateral axis of the lifting member. Thus, the rotor axes of rotation are generally perpendicular to the rotational axis of an above-described conventional flap-type control device. As a consequence of such a configuration, unlike a conventional control device, the torque or power requirement to actuate the control device of the present invention is not directly proportional to the air loads impinging thereon. This is because where the control device is in a fully deflected position with the support rotors rotated approximately 90° from their normal horizontally aligned position, the support rotors are at a maximal mechanical advantage with respect to the impinging air loads. In this respect, air loads impinging upon the control device body are transferred to the support rotors in a cantilever fashion with the support rotors experiencing shear and moment loads. As such, torque required to cause and maintain translation of the control body is minimal. As such, the present control device has a generally reduced actuation torque requirement in comparison to a conventional rotating control device for comparable air load conditions.

In addition, the flexible outer skins which are attached to and span between the lifting member and the control device body advantageously mitigates the aerodynamic penalties due to leakage at control device hinge line gaps, and gaps between the control device ends and the lifting member, which are typically associated with some prior art flap-type control devices.

Further, as mentioned above, outer skins are configured to be disposed in tension while the control device body is its upper and lower deflected positions. This is feasible because the control device body is configured to translate, rather than rotating like flap-type control devices. As such, this arrangement advantageously allows for the outer skins to be maintained in tension and therefore undesirable compression or buckling of the outer skins are avoided. Thus, the translational movement of the control device body facilitates maintaining a relatively smooth aerodynamic contour across both the upper and lower flexible outer skins during the entire range of motion of the control device body.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
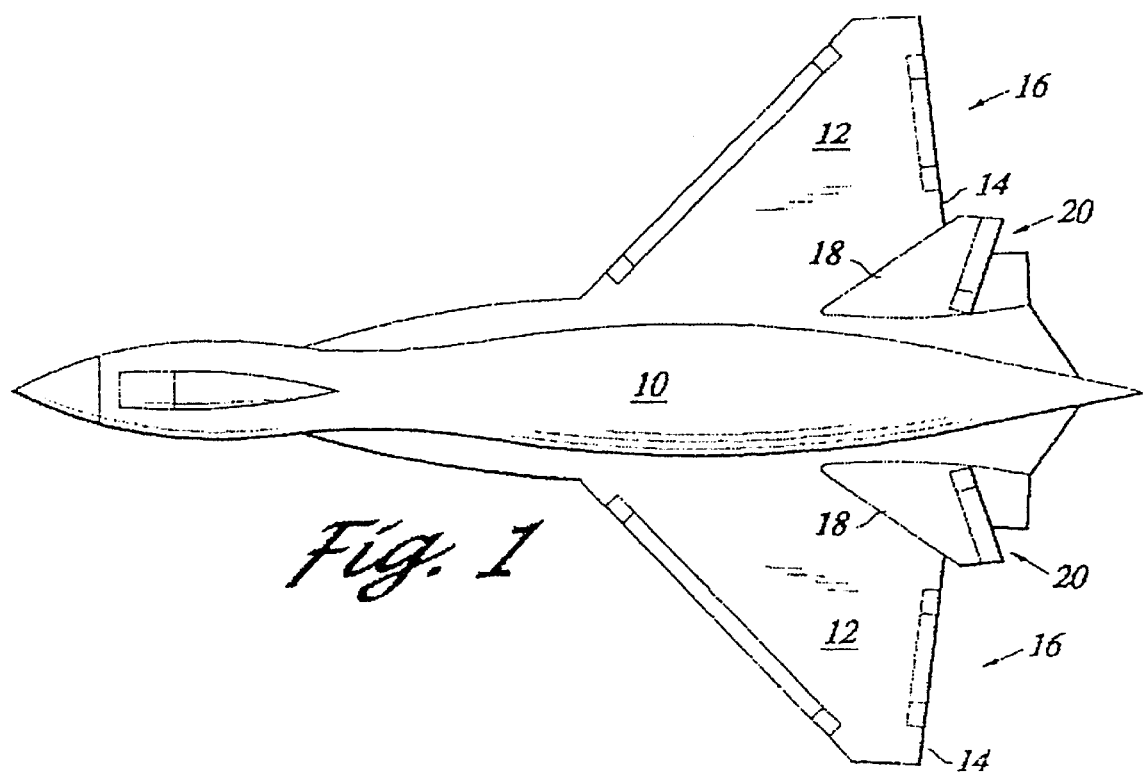
FIG. 1 is a top view of an embodiment of the aerodynamic control device of the present invention as integrated in an aircraft.

Referring now to the drawings wherein the showings are for purposes of illustrating a preferred embodiment of the present invention only, and not for purposes of limiting the same, FIGS. 1–12 illustrate an aerodynamic control device which is constructed in accordance with the present invention. As will be described in more detail below, the control device may be integrated with an aerodynamic lifting member for facilitating aerodynamic control of an aircraft.

Referring now to FIG. 1, there is depicted a representative aircraft 10 having opposing wings 12. The wings 12 have wing trailing edges 14. In one embodiment of the present invention, the wings 12 each have an aerodynamic control device 16 which are configured to be integrally disposed therewithin at the wing trailing edges 14. The exemplar aircraft 10 is further provided with a pair of vertical tails 18. In another embodiment of the present invention, the vertical tails 18 each have a control device 20 which are configured to be integrally disposed therewithin. It is contemplated that the present invention may be generally practiced in conjunction with any number of aerodynamic lifting members, such as those symbolically depicted in FIG. 1 as wings 12 and vertical tails 18.

For purposes of only describing the present invention and not limiting the same, however, FIGS. 2–10 symbolically depict an embodiment of the present invention as integrated with an aerodynamic lifting member in the form of the starboard wing 12. Similarly, FIGS. 11–12 symbolically depict another embodiment of the present invention as integrated with an aerodynamic lifting member in the form of the starboard vertical tail 18. It is contemplated that the present invention may be practiced with other aerodynamic lifting members which are oriented in other angular orientations and are of various shapes, sizes and configurations.

Figure 2:
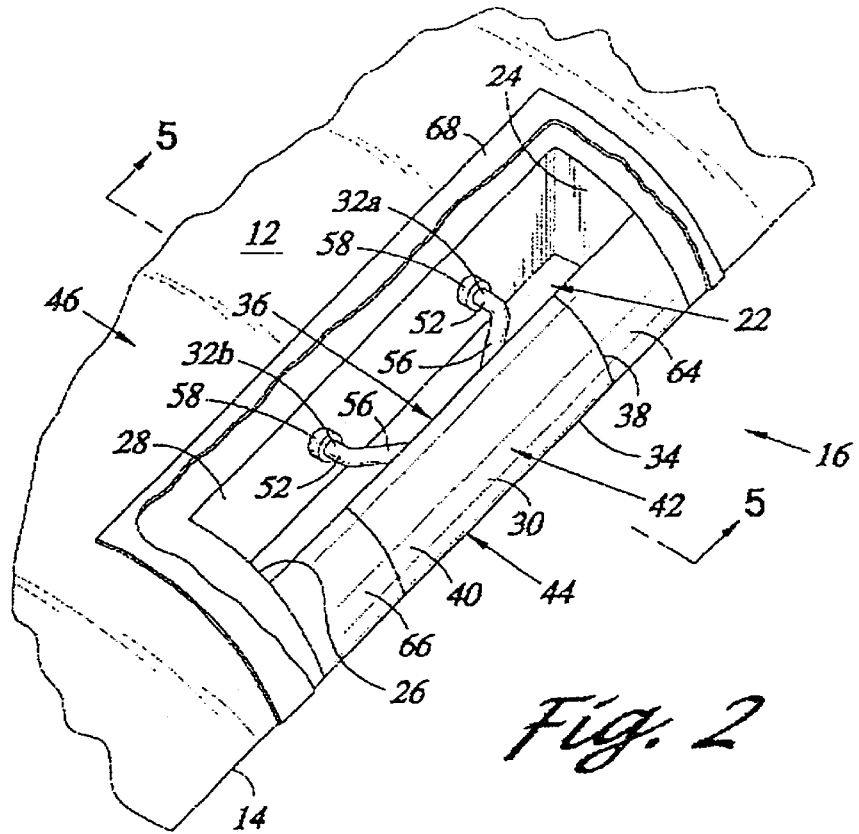
FIG. 2 is an enlarged exploded top-rear perspective view of the control device of the present invention as integrated with the starboard wing of the aircraft of FIG. 1 as shown with the control device in a normal undeflected position.

Referring now to FIG. 2, for ease of explanation, there is depicted an enlarged partial view of the starboard wing 12 of FIG. 1 as seen from a top-rear perspective. The wing 12 is provided with a indenture 22 adjacent the wing trailing edge 14. The indenture 22 is generally defined by first and second shoulder portions 24, 26 and an inboard wall portion 28 interposed therebetween. While the first and second shoulder portions 24, 26 and the inboard wall portion 28 are depicted as being solid surfaces, it is contemplated that such portions 24, 26, 28 are merely reference boundaries which define the indenture 22. In this regard, the first and second shoulder portions 24, 26 and the inboard wall portion 28 may be built up in a typical airframe construction, with ribs and a trailing edge spar.

While the first and second shoulder portions 24, 26 are depicted as being generally aligned chordwise and the inboard wall portion 28 is depicted as being generally aligned parallel with the wing trailing edge 14, such portions 24, 26, 28 may be configured at other angular orientations. This would allow for a variable sweep angle of the control surface or to provide for alignment with other manufacturing breaks. The first and second shoulder portions 24, 26 will generally intersect sharply with the wing trailing edge 14, as depicted. Should the wing trailing edge 14 be of a more rounded configuration, the indenture 22 may be designed to accommodate such a rounded contour. Furthermore, the indenture may be integrated at the distal tip of an aircraft wing such that the first shoulder portion 24 is disposed within a forward facing edge and the second shoulder portion 26 is disposed within a trailing edge.

Figure 4:
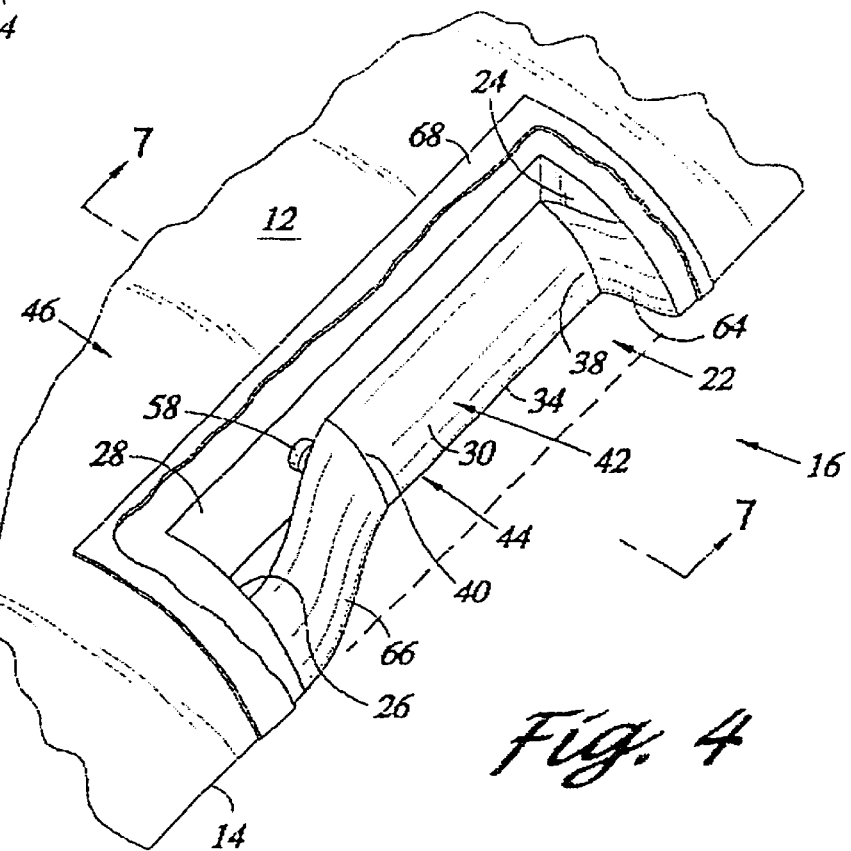
FIG. 4 is a similar enlarged exploded perspective view of the control device of FIG. 2 as shown with the control device in an upward deflected position.
Figure 5:
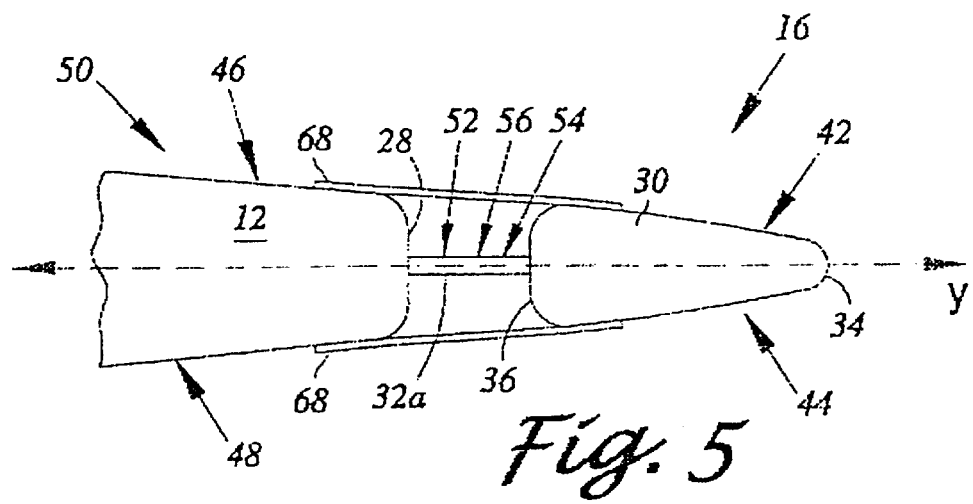
FIG. 5 is a side view of the control device of FIG. 2 as seen along axis 5—5.
Figure 8:
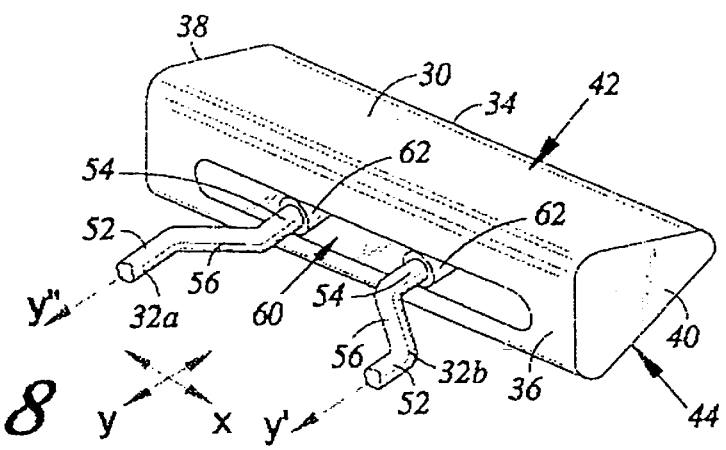
FIG. 8 is an enlarged exploded top-forward perspective view of the control device of FIG. 2.

The control device 16 is provided with a control device body 30 which is sized and configured to be received by the indenture 22. The control device 16 is further provided with a pair of support rotors 32a–b which extend from the indenture 22 for supporting the control device body 30. Importantly, as discussed in detail below, the control device body 30 is configured to translate with respect to the wing 12 from a normal undeflected position as shown in FIG. 2. Correspondingly, FIG. 5 depicts the control device body 30 in a cross-sectional side view in this normal undeflected position. FIG. 8 depicts the control device body 30 of FIG. 1 as seen from a top-forward perspective. Similar views are depicted with the control device body 30 in an downward deflected position in FIGS. 3, 6 and 9. The control device body 30 is depicted in an upward deflected position in FIGS. 4, 7 and 10.

The control device body 30 has a body trailing edge 34, an opposing inboard side 36, and opposing first and second ends 38, 40. The body trailing edge 34 is configured to be aligned with the wing trailing edge 14 when the control device body 30 is in its undeflected position, as shown in FIG. 2. The control device body 30 further has upper and lower body surfaces 42, 44 which taper to the body trailing edge 34.

It is contemplated that as the present invention may be practiced with other aerodynamic lifting members which are oriented in other angular orientations and are of various shapes, sizes and configurations, the control device body 30 may take the form of other shapes, sizes, orientations and configurations. For example, although not shown, where the present invention is integrated at the distal tip of a wing, the control device body 30 may be of a more corner or L-shape.

The wing 12 is provided with upper and lower wing surfaces 46, 48 which taper to the wing trailing edge 14. The upper and lower wing surfaces 46, 48 generally define an aerodynamic surface contour 50. As one of ordinary skill in the art can appreciate, when the control device body 30, and thus the control device 16, is in an undeflected position, as shown in FIG. 2, the upper and lower body surfaces 42, 44 are configured to generally follow the aerodynamic surface contour 50. In this respect the upper and lower body surfaces 42, 44 further define the aerodynamic surface contour 50.

As mentioned above, the control device 16 is provided with a pair of support rotors 32a–b. The support rotors 32a–b are used to attach the control device body 30 to the wing 12. The support rotors 32a–b each have inboard and outboard segments 52, 54 which may be connected by a cross segment 56. Preferably, the cross-segment 56 is canted at an angle such that the intersection or elbow between the cross-segment 56 and the inboard and outboard segments 52, 54 form obtuse angles. Such canting of the cross-segment 56 advantageously avoids undue vertical extension of the intersection between the cross-segment 56 and the inboard and outboard segments 52, 54 when the support rotors 32a–b are rotated. In the preferred embodiment of the present invention, the inboard and outboard segments 52, 54 are aligned generally parallel to each other and are separated by an off-set distance (OS), Importantly, the support rotors 32a–b facilitate translational movement of the control device body 30 relative to the wing 12. In this respects the wing 12 is generally defined by a horizontal reference plane defined by X and Y axes As such, the support rotors 32a–b facilitates translational movement of the control device body 30 relative to the horizontal reference plane (X–Y). Each of the support rotors 32a–b are sized and configured to rotate about rotor axes of rotation Y', Y" disposed generally parallel to the horizontal reference plane (X–Y) As such, preferably, the rotor axes of rotation Y', Y" are disposed generally perpendicular to the body trailing edge 34 when in its undeflected position, as shown in FIG. 2. The inboard segments 52 are disposed along the rotor axes of rotation Y', Y" and are in rotational communication with the wing 12. This arrangement allows the control device body 30 to translate generally orthogonal to the horizontal reference plane (X–Y) in response to rotation of the support rotors 32a–b.

The inboard segments 52 are rotatably engaged with the inboard wall portion 28 of the indenture 22. In particular, the inboard segments 52 are engaged by rotary actuators 58 which are fixed to the wing 12. It is contemplated that the rotary actuators 58 may be chosen from those which are well known to one of ordinary skill in the art.

The outboard segments 54 are preferably engaged with the inboard side 36 of the control device body 30 in slidable and rotatable communication. In this regard, the control device body 30 is provided with a slot 60 which is formed in the inboard side 36 thereof. The outboard segments 54 may be fitted with roller bearings 62, although other methods and apparatus for facilitating such slidable and rotatable engagement may be chosen from those which are well known to one of ordinary skill in the art.

Figure 3:
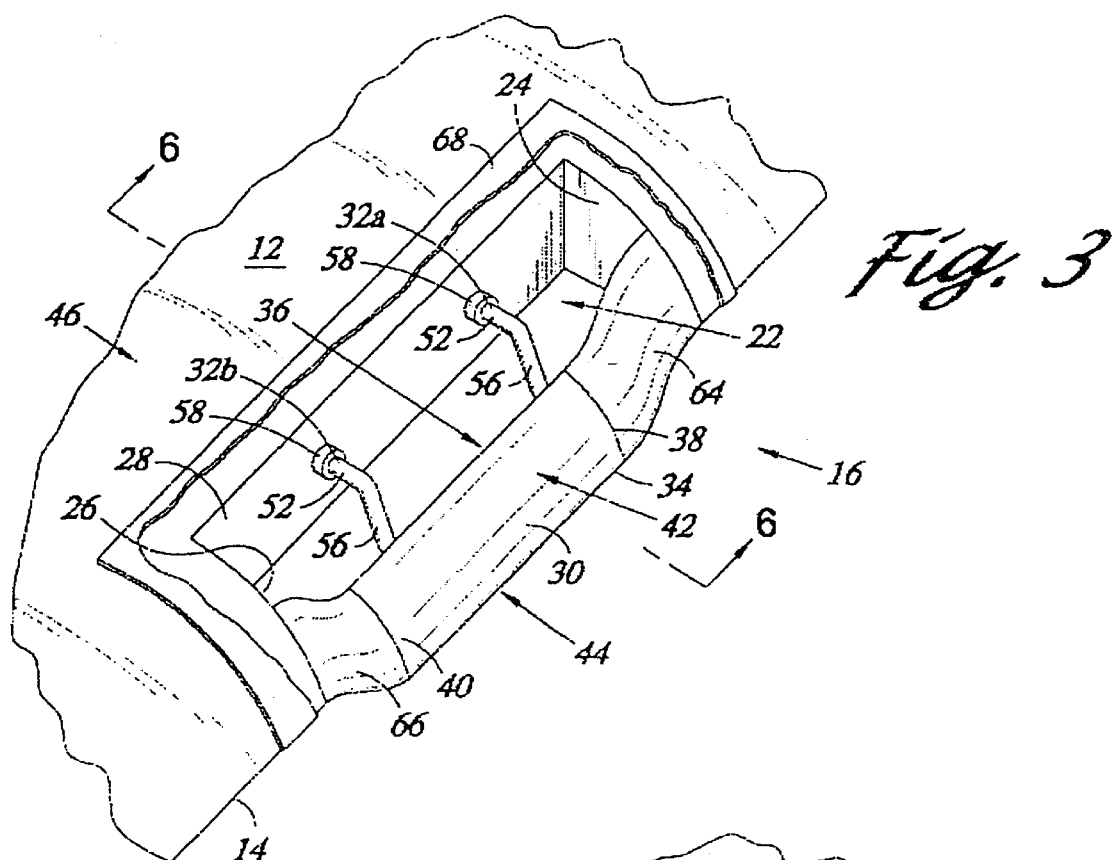
FIG. 3 is a similar enlarged exploded perspective view of the control device of FIG. 2 as shown with the control device in a downward deflected position.
Figure 6:
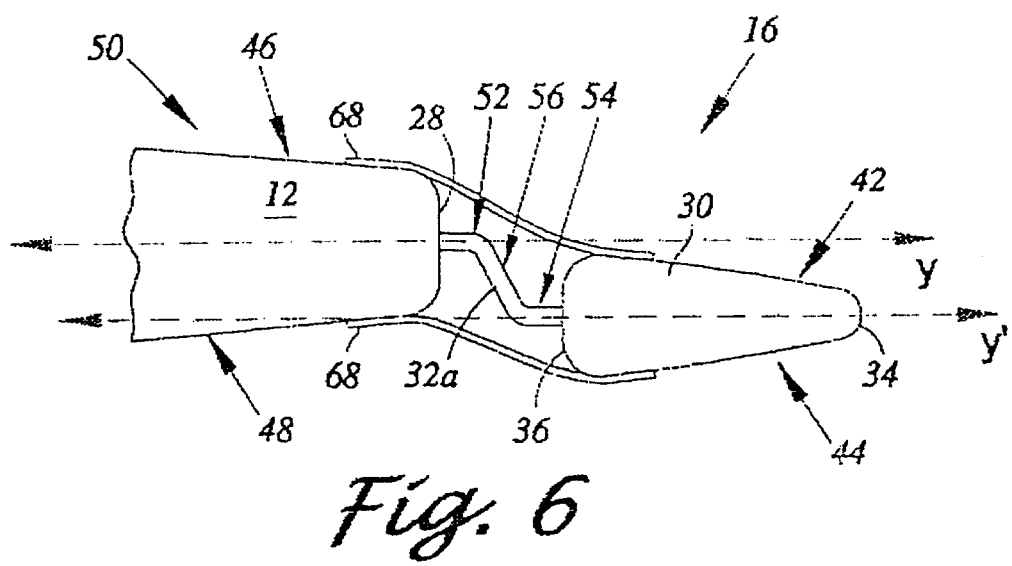
FIG. 6 is a side view of the control device of FIG. 3 as seen along axis 6—6.
Figure 7:
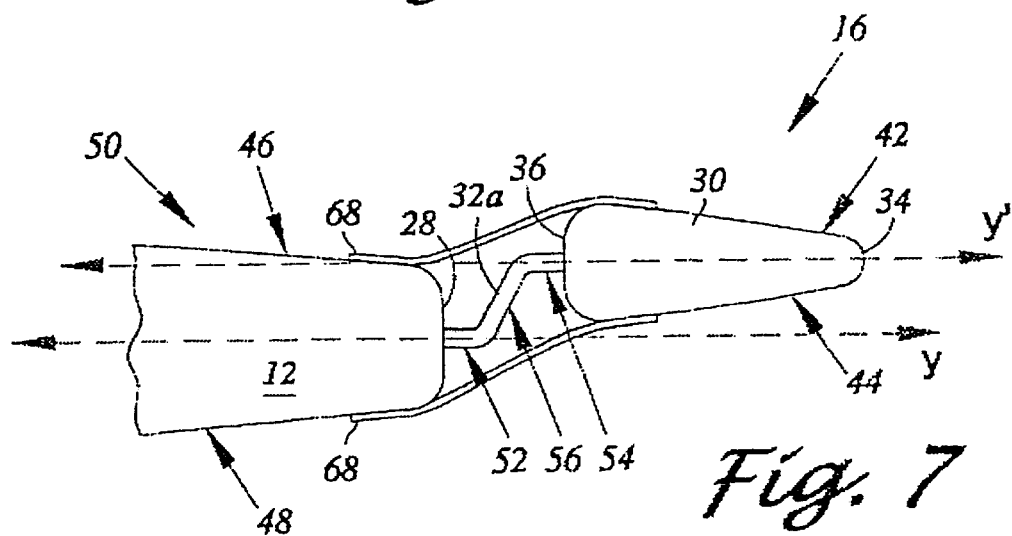
FIG. 7 is a side view of the control device of FIG. 4 as seen along axis 7—7.
Figure 9:
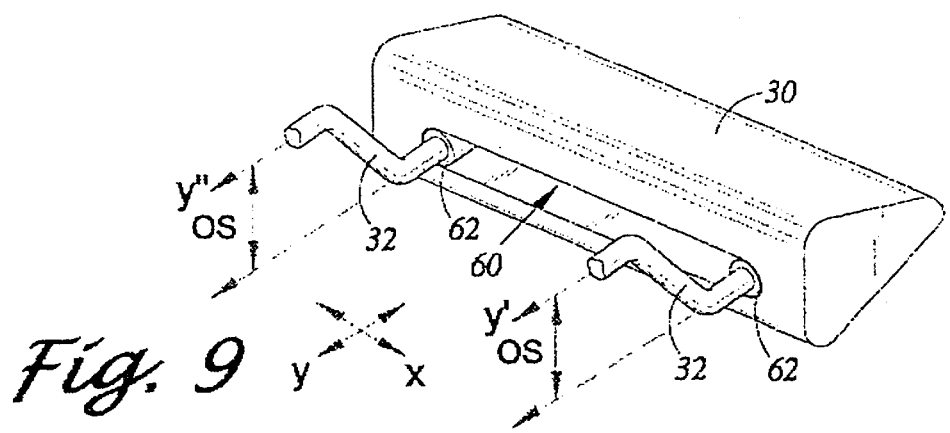
FIG. 9 is an enlarged exploded top-forward perspective view of the control device of FIG. 3.
Figure 10:
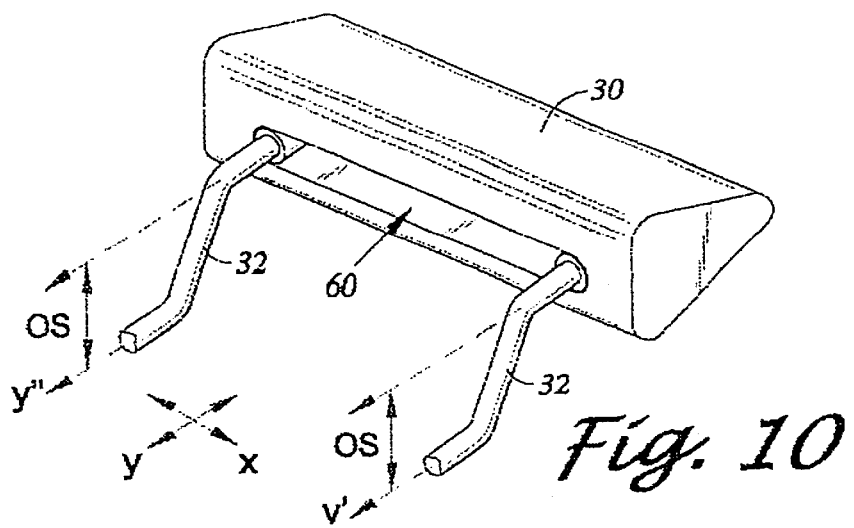
FIG. 10 is an enlarged exploded top-forward perspective view of the control device of FIG. 4.

It is contemplated that the translational movement of the control device body 30 is effectuated by rotating the support rotors 32a–b in opposing rotational directions. Referring to FIGS. 3, 6 and 9, the support rotors 32a–b are rotated by 90° in opposite directions relative to their respective positions in FIGS. 2, 5 and 8. As a result of such rotation of the support rotors 32a–b about the inboard segments 52 thereof, the outboard segments 54 translate downward away from each other. This downward movement causes the slidably and rotatably engaged control body 30 to likewise move downward as shown. As can be seen, the maximal amount of downward translation of the control body 30 is controlled by the off-set distance (OS) between the inboard and outboard segments 52, 54. Similarly, referring now to FIGS. 4, 7 and 10, the support rotors 32a–b may be rotated so as to move the outboard segments 54 upward and away from each other. This upward movement causes the slidably and rotatably engaged control body 30 to move upward as well. The maximal amount of upward translation of the control body 30 is controlled by the off-set distance (OS) between the inboard and outboard segments 52, 54.

The support rotors 32a–b are sized and configured to be of sufficient mechanical strength to facilitate the transfer of any air loads (and induced strains in flexible transition sections 64, 66 and a flexible outer skin 68, as discussed below) which take the form of both shear and bending loads. The particular material selection for the support rotors 32a–b is chosen from those which are well known to one of ordinary skill in the art, and may include a tubular metal alloy. It is contemplated that when the control device 16 is in a fully deflected position with the support rotors 32a–b rotated approximately 90° from their normal horizontally aligned position, the support rotors 32a–b are at a maximal mechanical advantage with respect to any impinging air loads. In this respect, air loads impinging upon the upper or lower body surfaces 42, 44 are transferred to the support rotors 32a–b in a cantilever fashion with the support rotors 32a–b experiencing shear and moment loads. As such, the air load component of the torque required to cause and maintain translation of the control device body 30 is mitigated.

While the support rotors 32a–b are depicted as being rotated by comparable amounts of angular rotation, differential rotations may be facilitated. As one of ordinary skill in the art will appreciate, such differential rotation would result in the control device body 30 being rotated about an axis of rotation which is parallel to the rotor axes of rotation Y', Y". This would provided a means of tailoring the aerodynamic function of the control surface. For example, considering a trailing edge device, greater pitch control may be obtained by greater relative deflections of the inboard most rotor 32. Similarly, greater roll control could be achieved by greater relative deflection of the outboard most rotor 32. As such, the control device of the present invention may be adapted to replace more traditional single purpose-type of control devices.

Preferably, the control device 16 is provided with first and second transition portions 64, 66. The first transition portion 64 attaches the first end 38 of the control device body 30 to the first shoulder portion 24 of the indenture 22. The second transition portion 66 attaches the second end 40 of the control device body 30 to the second shoulder portion 26 of the indenture 22. Importantly, the first and second transition portions 64, 66 are sized and configured to deform in response to translation of the control device body 30. As can be seen, the cross sectional shaping of the transition portions 64, 66 generally conforms to that of the control device body 30 and follows the aerodynamic surface contour 50. As such, the transition sections 64, 66 may blend with the control device body 30 so as to form a unitary structure. The transition portions 64, 66 are configured to smooth the discontinuity of the surface contour 50 when the control device body 30 is deflected. In this respect, the transition portions 64, 66 further define the surface contour 50. As shown in FIGS. 3 and 4, the transition portions 64, 66 are configured to assume an S-shape in response to the translation of the control device body 30 from its normal undeflected position. It is contemplated that the transition portions 64, 66 may be configured to more sharply transition in a ramp-like manner rather than the depicted curved S-shape. The particular material for the transition sections 64, 66 are chosen from those which are well known to one of ordinary skill in the art and may include a flexible elastomeric material such as durable rubber. The methods of attachment of the transition portions 64, 66 to the control device body 30 and the shoulder portions 24, 26 are chosen from those which are well known to one of ordinary skill in the art.

Preferably, the control device 16 is further provided with a flexible outer skin 68 attached to the wing 12 and the control device body 30 spanning over the indenture 22. The outer skin 68 is in mechanical communication with, preferably bonded to, the upper and lower body surfaces 42, 44 and the upper and lower wing surfaces 46, 48 adjacent the indenture 22. The shape of the flexible outer skin 68 is dictated by the position of the underlying control device body 30 and the transition portions 64, 66. Thus, the outer skin 68 is sized and configured to deform in response to movement of the control device body 30, and further defines the aerodynamic surface contour 50. Although the outer skin 68 is depicted as completely wrapping around the control device body 30, the outer skin 68 does not have to completely cover the control device body 30. In this regard, the outer skin 68 may be formed of multiple pieces and attached along the edge of the upper and lower body surfaces 42, 44. Thus, the outer skin 68 is used to form a transition surface about the "hingeline" formed between the control device body 30 and the indenture 22. Further, the outer skin 68 may include reinforcement rods which are integrated with the outer skin 68 for supporting air loads thereat. The particular material selection for the outer skin 68 and method of attachment are chosen from those which are well known to one of ordinary skill in the art, and may include, for example, elastomeric materials such as rubber sheeting.

Figure 11:
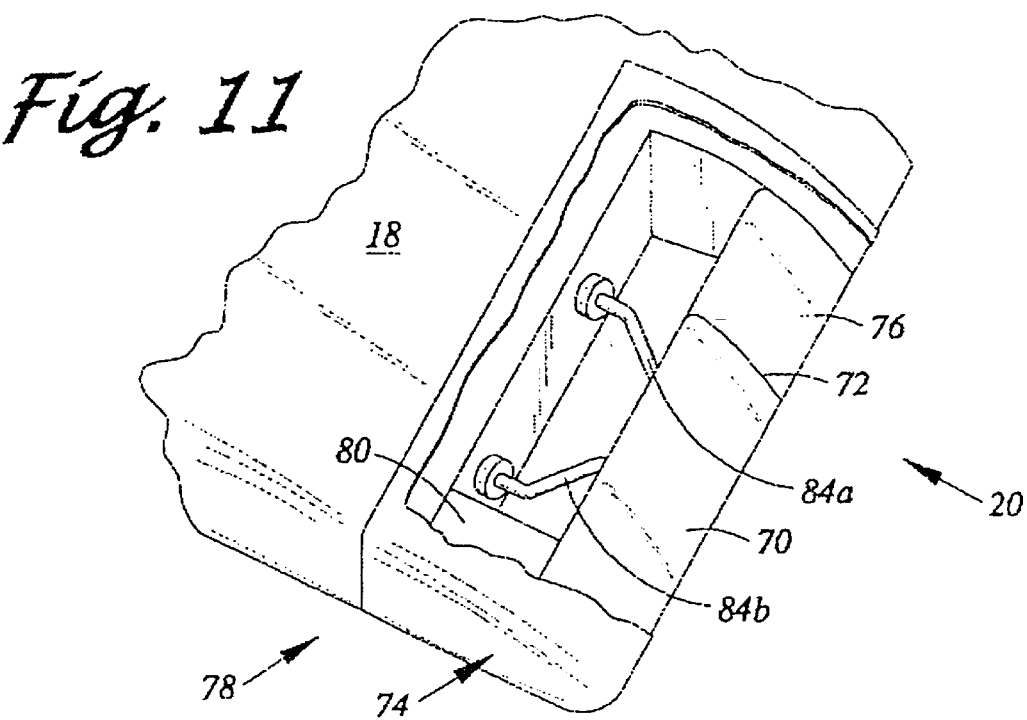
FIG. 11 is an enlarged exploded top-rear perspective view of the control device of the another embodiment of the present invention as integrated with the starboard tail fin of FIG. 1 as shown with the control device in a normal undeflected position.
Figure 12:
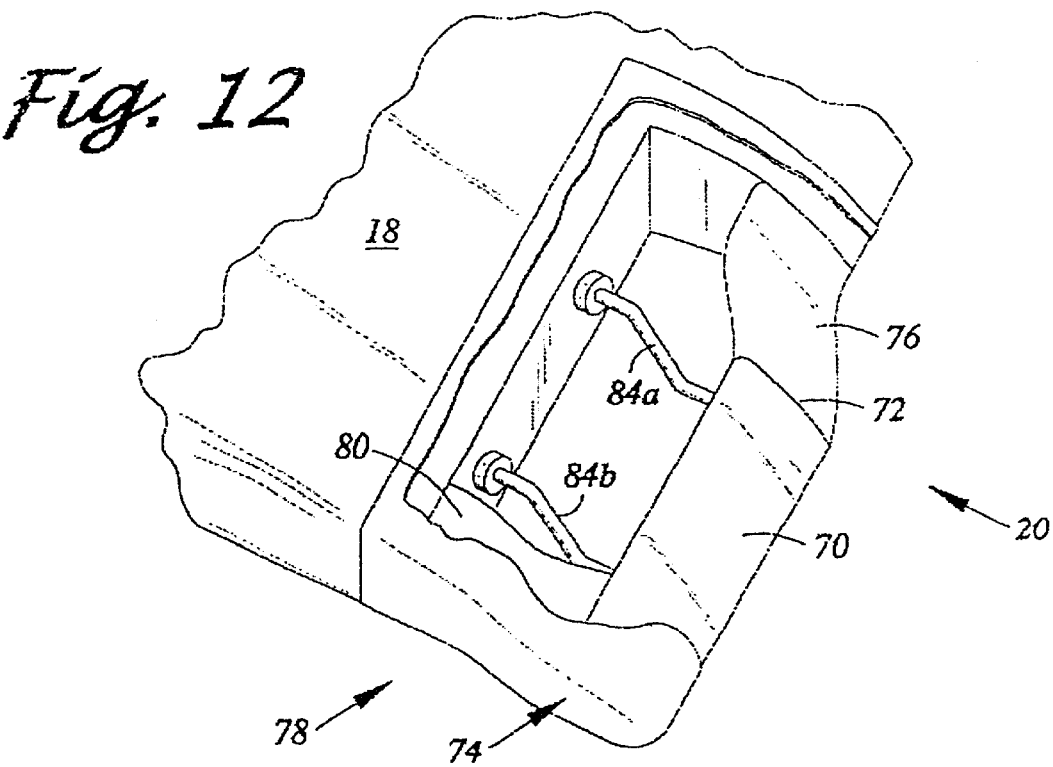
FIG. 12 is a similar enlarged exploded perspective view of the control device of FIG. 11 as shown with the control device in a downward deflected position.

Referring now to FIGS. 11 and 12, there is depicted another embodiment of the present invention as integrated with the starboard vertical tail 18 of FIG. 1. FIG. 11 depicts the control device 20 in a normal undeflected position and FIG. 12 depicted the control device 20 in a outboard deflected position. The control device 20 is provided with a control device body 70 having first and second ends 72, 74 thereof. The second end 74 is relatively exposed so as to form a distal tip 78 of the vertical tail 18. The control device body 70 is joined to the vertical tail 20 via an inboard transition portion 76 which is constructed and configured in an analogous manner as the first transition portion 64 of the above described embodiment. The control device 20 may be further provided with an outboard transition portion 80 which is attached to an inboard side 82 of the control device body 70. In this regard, the outboard transition portion 80 further defines the distal tip 78. The control device 20 is further provided with support rotors 84a–b which are constructed and configured in an analogous manner as the support rotors 32a–b of the above described embodiment.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An aerodynamic control device for use with an aerodynamic lifting member, the lifting member being defined by a horizontal reference plane disposed therethrough, the control device comprising:

at least one support rotor extending from the lifting member, the support rotor being sized and configured to rotate about a rotor axis of rotation disposed generally parallel to the horizontal reference plane, the support rotor having an inboard segment disposed along the rotor axis of rotation and in rotational communication with the lifting member, the support rotor having an outboard segment disposed off-set from the rotor axis of rotation, the inboard and outboard segments of the support rotor being aligned generally parallel to each other; and a control device body engaged with the outboard segment of the support rotor, the control device body being sized and configured to translate generally orthogonal to the horizontal reference plane in response to rotation of the support rotor.

2. The aerodynamic control device of claim 1 wherein the outboard segment of the support rotor is in rotational engagement with the control device body.

3. The aerodynamic control device of claim 1 wherein the outboard segment of the support rotor is in slidable engagement with the control device body.

4. The aerodynamic control device of claim 3 wherein the control device body having a slot formed therein, the outboard segment of the support rotor is sized and configured to slidably engage the slot.

5. The aerodynamic control device of claim 1 wherein the at least one support rotor comprises a pair of support rotors.

6. The aerodynamic control device of claim 5 wherein the support rotors are sized and configured to rotate in opposing rotational directions for translating the control device body orthogonal to the horizontal reference plane.

7. The aerodynamic control device of claim 1 wherein the control device body has a trailing edge.

8. The aerodynamic control device of claim 7 wherein the rotor axis of rotation is disposed generally perpendicular to the trailing edge of the control device body.

9. The aerodynamic control device of claim 1 further comprises a rotational actuator for rotating the support rotor, the actuator being disposable within the lifting member and in mechanical communication with the inboard segment of the support rotor.

10. The aerodynamic control device of claim 1 further comprises a flexible outer skin attached to the lifting member and the control device body, the outer skin is sized and configured to deform in response to translation of the control device body.

11. The aerodynamic control device of claim 10 wherein the flexible outer skin is formed of an elastomeric material.

12. The aerodynamic control device of claim 1 wherein the lifting member has upper and lower lifting member surfaces and the control device body has upper and lower body surfaces, the control device further comprises upper and lower flexible outer skins, the upper flexible outer skin is attached to the upper lifting member surface and the upper body surface, the lower flexible outer skin is attached to the lower lifting member surface and the lower body surface.

13. The aerodynamic control device of claim 12 wherein the control device body has an upper deflected position with the control device body translated in a direction of the upper body surface and the upper and lower flexible outer skins being disposed in tension.

14. The aerodynamic control device of claim 12 wherein the control device body has a lower deflected position with the control device body translated in a direction of the lower body surface and the upper and lower flexible outer skins being disposed in tension.

15. The aerodynamic control device of claim 1 wherein the control device body has opposing first and second ends thereof, the control device further comprises first and second transition portions respectively attached to the first and second ends of the control device body, the first and second transition portions are attached to the lifting member.

16. The aerodynamic control device of claim 15 wherein the first and second transition portions are sized and configured to deform in response to translation of the control device body.

17. The aerodynamic control device of claim 16 wherein the first and second transition portions are sized and configured to deform into an S-shape.

18. The aerodynamic control device of claim 15 wherein the aerodynamic lifting member has an indenture formed therein, the indenture being defined by first and second shoulder portions, the first and second transition portions are respectively attached to the first and second shoulder portions.

19. The aerodynamic control device of claim 15 further comprises a flexible outer skin attached to the lifting member, the control device body and the first and second transition portions, the outer skin is sized and configured to deform in response to translation of the control device body.

20. The aerodynamic control device of claim 15 wherein the lifting member has upper and lower lifting member surfaces, the control device body has upper and lower body surfaces, the first and second transition portions respectively have upper and lower surfaces thereof, the control device further comprises upper and lower flexible outer skins, the upper flexible outer skin is attached to the upper lifting member surface, the upper body surface and the upper surfaces of the first and second transition portions, the lower flexible outer skin is attached to the lower lifting member surface, the lower body surface and the lower surfaces of the first and second transition portions.

21. The aerodynamic control device of claim 20 wherein the control device body has an upper deflected position with the control device body translated in a direction of the upper body surface and the upper and lower flexible outer skins being disposed in tension.

22. The aerodynamic control device of claim 20 wherein the control device body has a lower deflected position with the control device body translated in a direction of the lower body surface and the upper and lower flexible outer skins being disposed in tension.

23. An aerodynamic lifting member being generally defined by a horizontal reference plane disposed therethrough, the lifting member comprising:

a lifting member body having an indenture formed therein, the indenture being defined by first and second shoulder portions; and a control device attached to the lifting member body, the control device having first and second transition portions, the first and second transition portions being respectively attached to the first and second shoulder portions of the lifting member body, the control device comprising:

at least one support rotor extending from the lifting member body, the support rotor being sized and configured to rotate about a rotor axis of rotation disposed generally parallel to the horizontal reference plane, the support rotor having an inboard segment disposed along the rotor axis of rotation and in rotational communication with the lifting member body, the support rotor having an outboard segment disposed off-set from the rotor axis of rotation; and a control device body having opposing first and second ends, the first and second ends being respectively attached to the first and second transition portions of the control device, the control device body being engaged with the outboard segment of the support rotor, the control device body being sized and configured to translate generally orthogonal to the horizontal reference plane in response to rotation of the support rotor.

24. The aerodynamic lifting member of claim 23 wherein the lifting member body is a wing.

25. An aerodynamic control device for use with an aerodynamic lifting member, the lifting member having upper and lower lifting member surfaces, the lifting member being defined by a horizontal reference plane disposed therethrough, the control device comprising:

at least one support rotor extending from the lifting member, the support rotor being sized and configured to rotate about a rotor axis of rotation disposed generally parallel to the horizontal reference plane, the support rotor having an inboard segment disposed along the rotor axis of rotation and in rotational communication with the lifting member, the support rotor having an outboard segment disposed off-set from the rotor axis of rotation;

upper and lower flexible outer skins; and a control device body having upper and lower body surfaces, the upper flexible outer skin being attached to the upper lifting member surface and the upper body surface, the lower flexible outer skin being attached to the lower lifting member surface and the lower body surface, the control device body having an upper deflected position with the control device body translated in a direction of the upper body surface and the upper and lower flexible outer skins being disposed in tension, the control device body being engaged with the outboard segment of the support rotor, the control device body being sized and configured to translate generally orthogonal to the horizontal reference plane in response to rotation of the support rotor.

26. The aerodynamic control device of claim 25 wherein the control device body has a lower deflected position with the control device body translated in a direction of the lower body surface and the upper and lower flexible outer skins being disposed in tension.

27. An aerodynamic control device for use with an aerodynamic lifting member, the lifting member having an indenture formed therein, the indenture being defined by first and second shoulder portions, the lifting member being defined by a horizontal reference plane disposed therethrough, the control device comprising:

at least one support rotor extending from the lifting member, the support rotor being sized and configured to rotate about a rotor axis of rotation disposed generally parallel to the horizontal reference plane, the support rotor having an inboard segment disposed along the rotor axis of rotation and in rotational communication with the lifting member, the support rotor having an outboard segment disposed off-set from the rotor axis of rotation;

first and second transition portions, the first and second transition portions being respectively attached to the first and second shoulder portions; and a control device body having opposing first and second ends, the first and second ends being respectively attached to the first and second transition portions of the control device, the control device body being engaged with the outboard segment of the support rotor, the control device body being sized and configured to translate generally orthogonal to the horizontal reference plane in response to rotation of the support rotor.

28. The aerodynamic control device of claim 27 wherein the first and second transition portions are sized and configured to deform in response to translation of the control device body.

29. The aerodynamic control device of claim 28 wherein the first and second transition portions are sized and configured to deform into an S-shape.

30. The aerodynamic control device of claim 27 further comprises a flexible outer skin attached to the lifting member, the control device body and the first and second transition portions, the outer skin being sized and configured to deform in response to translation of the control device body.

31. An aerodynamic control device for use with an aerodynamic lifting member, the lifting member having upper and lower lifting member surfaces, the lifting member being defined by a horizontal reference plane disposed therethrough, the control device comprising:

at least one support rotor extending from the lifting member, the support rotor being sized and configured to rotate about a rotor axis of rotation disposed generally parallel to the horizontal reference plane, the support rotor having an inboard segment disposed along the rotor axis of rotation and in rotational communication with the lifting member, the support rotor having an outboard segment disposed off-set from the rotor axis of rotation;

upper and lower flexible outer skins;

first and second transition portions respectively having upper and lower surfaces, the first and second transition portions being attached to the lifting member; and a control device body having upper and lower body surfaces, the control device body further having opposing first and second ends, the first and second ends being respectively attached to the first and second transition portions of the control device, the upper flexible outer skin being attached to the upper lifting member surface, the upper body surface and the upper surfaces of the first and second transition portions, the lower flexible outer skin being attached to the lower lifting member surface, the lower body surface and the lower surfaces of the first and second transition portions, the control device body having an upper deflected position with the control device body translated in a direction of the upper body surface and the upper and lower flexible outer skins being disposed in tension, the control device body being engaged with the outboard segment of the support rotor, the control device body being sized and configured to translate generally orthogonal to the horizontal reference plane in response to rotation of the support rotor.

32. The aerodynamic control device of claim 31 wherein the control device body has a lower deflected position with the control device body translated in a direction of the lower body surface and the upper and lower flexible outer skins being disposed in tension.

* * * * *